United States Patent [19]
Cobb

[11] 3,837,634
[45] Sept. 24, 1974

[54] CUTTING BOARD

[76] Inventor: Westray Stewart Cobb, 1820 Casselberry Rd., Louisville, Ky. 40205

[22] Filed: Feb. 28, 1973

[21] Appl. No.: 336,431

[52] U.S. Cl............. 269/289, 144/315 R, 161/162, 161/43, 161/270, 269/302.1
[51] Int. Cl............................................ B23q 3/00
[58] Field of Search ........ 144/310 R, 310 B, 315 R; 156/94–98; 161/43, 162, 168, 261, 270; 264/36; 269/289, 302.1

[56] References Cited
UNITED STATES PATENTS 2,018,712   10/1935   Elmendorf .................... 161/123
2,831,794   4/1958    Elmendorf .................... 161/162 X
2,847,733   8/1958    Roy ............................... 161/162 X
2,859,187   11/1958   Ropella ......................... 161/168 X

*Primary Examiner*—George F. Lesmes
*Assistant Examiner*—Henry F. Epstein

[57] ABSTRACT

A cutting board comprised of a particle board center having a plurality of veneer strips adhesively secured to the top and bottom surfaces thereof and lumber edge members adhesively secured to its edges, the securing adhesive coating the entire surface of said particle board to prevent water from penetrating into said board, the overall result being an inexpensive, dimensionally stable cutting board having the appearance of being made from solid pieces of lumber.

6 Claims, 4 Drawing Figures

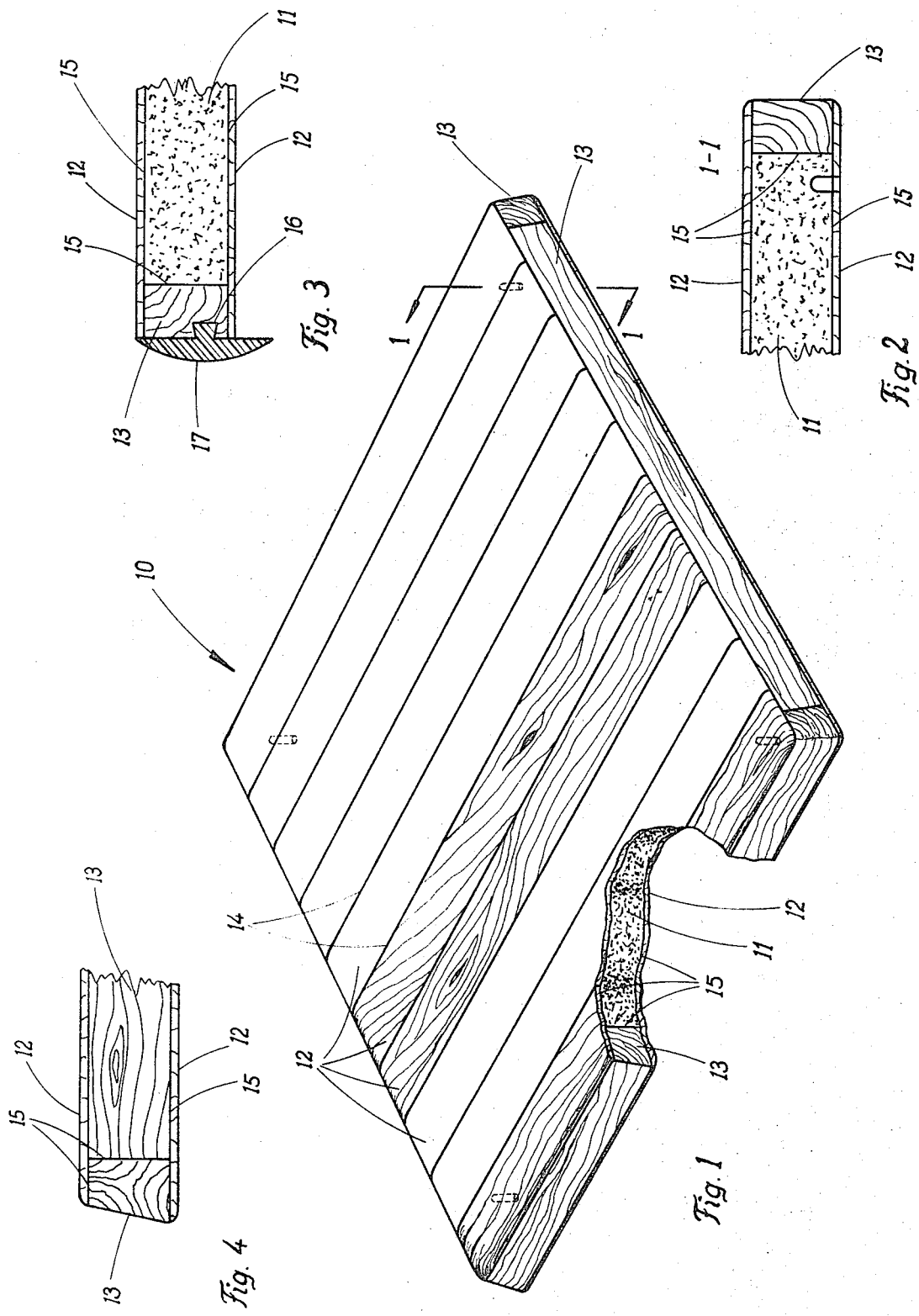

CUTTING BOARD

BACKGROUND OF THE INVENTION

It has long been a challenge to the wood products industry to fabricate a composite board which would be dimensionally stable and inexpensive for use as a cutting board to be mounted on a household appliance. One of the motivating factors behind the attempt to produce such a board is the general scarcity and high cost of lumber for wookworking. Attempts were made at fabricating such a board from various materials such as strips of solid lumber adhesively secured in edge to edge fashion.

Such attempts were unsuccessful in that the ratio of surface area of wood adhesively coated to the volume of wood in the lumber strip was so low that the adhesive was incapable of holding fast the lumber strips to prevent them from warping and separating. Veneer strips were dismissed as being unsuitable because of their obvious inability to withstand continued use as a cutting board surface. The cutting board of this invention has overcome the prior art problems and has provided an inexpensive, readily constructed, dimensionally stable cutting board capable of withstanding continued use and exposure to moisture or even the elements.

SUMMARY OF THE INVENTION

The invention provides a dimensionally stable cutting board suitable for use under conditions of continued exposure to moisture. The invention further provides a cutting board having a particle board core, veneer surfaces and lumber edge members which looks like a cutting board made of solid lumber strips. More specifically, the invention provides a cutting board adapted to be attached to the top of a household appliance comprising: a particle board core; a layer of adhesive completely coating said particle board core; a plurality of relatively thin veneer sheets adhesively attached to opposed faces of said particle board core in an orderly fashion to provide a durable cutting surface whereby the board has the appearance of being of solid lumber construction; lumber edge members surrounding the edges of said particle board core and overlaid by said veneer sheets; the adhesive coating being further characterized in that it forms a waterproof barrier surrounding said particle board core and attaches said veneer sheets and lumber edge members to said core. The present invention has been found to be particularly advantageous where the cutting board is repeatedly exposed to temperatures and humidity above normal room temperature and humidity.

DESCRIPTION OF THE DRAWING

FIG. 1 is an isometric view of the cutting board of this invention.

FIG. 2 is a partial side elevational view of the cutting board of FIG. 1.

FIG. 3 is a partial side elevational view of an alternative embodiment of the cutting board of FIG. 1.

FIG. 4 is a partial side elevational view of the cutting board of FIG. 1.

DESCRIPTION OF THE PREFERRED EMBODIMENT

FIG. 1 shows cutting board 10 comprised of a center core 11 which may be fabricated from any one of a number of man-made construction boards such as fiberboard, composite board, particle board and the like. Such boards are generally very similar in make-up, being principally waste material such as fibers, shavings, sawdust, waste material ground or particulated exclusively for such purpose, and the like. Most preferred is particle board such as that described in detail in U.S. Department of Commerce Commercial Standard CS 236-66, entitled "Mat Formed Wood Particle Board," published by the National Bureau of Standards Forest Products Laboratory — Forest Service, U.S. Department of Agriculture; incorporated herein by reference. Preferably, a resin impregnated particle board described as Type 1, Grade 3 in CS 236-66 of 45 pounds per cubic foot density is used. Adhesively secured to one side of core 11 are a plurality of wood strips 12. These strips are preferably veneer, i.e., they are thin pieces of high quality lumber, which in the instant case is preferably sized to a width of about 2¼ inches and a thickness of one twenty-second to one-tenth inch, with a thickness of about one-sixteenth inch being most preferred. Adhesively secured to the opposed side of said center core 11 is a layer of veneer which may be in the form of pieces of flat strips but is most preferably in the form of a single flat sheet. It should be noted that in the cutting board application for which the present board is intended, the veneer thickness must be at least one twenty-second inch in thickness, and must be securely fastened to a support, such as center core 11. Thinner veneer will not work as a cutting board surface since it is subject to being cut through in normal household use. The use of veneer thicker than one-tenth inch becomes prohibitive in cost and is unjustifiable for fabricating a cutting board surface. The veneer strips 12 are adhesively secured to the top surface of center core 11 and aligned side by side in parallel relationship to cover the entire surface with their respective grains running in generally the same direction to give the appearance that the board has been fabricated from solid pieces of lumber approximately 2¼ inches wide and three quarters of an inch thick adhesively secured side by side to each other. The advantages of having a plurality of veneer strips attached to the cutting surface of the board are as follows: Firstly, the division of strips into 2¼ inch widths allows for greater surface stability when the surface is exposed to water. It is commonly appreciated, that wood does not swell in its grain direction, that is along its length, but does swell in both width and thickness. Thus, restricting the size of the strips and thus the swelling forces on the cutting surface the dimensional stability thereof is more easily maintained. Secondly, thin glue joints between strips act as expansion joints 14 to take up any dimensional changes and thereby prevent buckling: and, thirdly, the provision of veneer strips having widths of 2¼ inches or less and thickness of about one-sixteenth of an inch limits the total volume of any single piece of veneer so that the ratio of surface area covered by adhesive, to volume thereof is very high and, since more than one-half of the surface area of each single piece of veneer is coated with adhesive (the surface adjacent the core and the sides), the swelling and warping of the strip is more easily restrained.

The veneer itself should be of a high quality No. 1 exterior grade and should be sanded smooth. The grain and color contrast of the several strips 12 should be such that it creates the appearance of the board being lumber pieces adhesively secured together. Preferably, a sliced maple veneer is used. Other suitable woods are cherry, beech, birch and walnut.

The surface of the board after laminating the veneer strips thereto is dipped or sprayed with an edible oil such as "Stanolin" manufactured and sold by the Standard Oil Company of Kentucky. In the alternative, No. 12 fine mineral oil manufactured by American Oil Company of Chicago, Illinois can be used. Other suitable oils are the edible low fat polyunsaturated oils commonly noted under the tradenames Crisco, Mazola and the like.

Prior to adhesively attaching the veneer strips 12 to the surfaces of center core 11, lumber edge members 13 are adhesively fastened to the edges of center core 11. These lumber edge members are typically of the same grade of lumber as the veneer strips but need not be so. Typically, the wood selected for use as edge members is of the group comprised of maple, cherry, beech, birch and walnut. Also selected, white or yellow poplar is very suitable. These woods are especially preferred since they are found not to give a taste to foods which come in contact therewith. This is in contradistinction to a wood such as teak wood, for example, which is known to have a large amount of extractive or extractable gums and resins which tend to give contacted foods a bitter undesirable taste. Teak wood and other woods having a high content of extractive substances also suffer from the disadvantage that they are difficult to finish to a smooth surface, since the extractives tend to migrate to the surface to give a grainy feel thereto.

It is important to note that the center core 11 is entirely coated by adhesive 15 after lumber edge members 13 and veneer strips 12 have been adhesively attached thereto. This feature of the invention is important in the success of the use of a particle board center core, for it is because of this complete adhesive barrier entirely coating the particle board that moisture is prevented from penetrating the board and causing it to deteriorate, expand or warp. It is this complete coating of the particle board plus the adhesive expansion joints between strips of veneer, in combination with the sizing of the veneer strips to provide a high surface area coated with adhesive to volume ratio that give the cutting board of this invention strength, durability and dimensional stability which exceeds any solid or laminated board heretofore known; all of this being accomplished at a lower cost.

The adhesive material itself can be any one of a number of adhesives which meet the requirements for type (1) "Waterproof" standard as defined in Standard S-69 of the Hardwood Plywood Manufacturing Association. Examples of suitable adhesives are the urea-formaldehyde resin type adhesives. Specifically, suitable adhesives include such commercially available adhesives as: National Casein Company No. 750 — Liquid Urea Resin; National Casein Company No. 360; and National Casein Company resin No. 600. All three of these adhesives are reinforced with malamine for additional water resistance. Normally, the adhesive used to secure the edge members and sheets of veneer are to the particle core is suitable for use in a "hot" process. One such "hot" process includes the use of induction heating of the adhesive. The composite cutting board of this invention is generally fabricated in the following sequence. The veneer strips 12 are first cut and adhesively attached in edge-to-edge fashion to form a sheet of veneer. This sheet is fabricated with the aid of a veneer splicer. The adhesive joints formed between the strips then comprise expansion joints 14. The lumber edge members 13 are next adhesively secured to the edges of center core 11. A sheet of veneer is then cut to be adhesively secured to the lower surface of core 11. Then, both sheets of veneer are adhesively attached to the respective upper and lower surfaces of the center core 11 overlapping lumber edges 13. The composite board is then surface finished and sprayed with oil. The result is an inexpensive, easily prepared, maintenance free, dimensionally stable, waterproof, cutting board which is readily adaptable to be fastened to a household appliance to be used indoors or even a grill or the like, to be used outdoors.

FIG. 3 shows an alternative embodiment of the invention wherein one or more of lumber edge members 13 has a fastening means in the form of a groove portion 16 cut therein. Groove portion 16 allows a skirt member 17 to be appended to cutting board 10 to give the appearance of a much thicker board. It should be noted that only Applicant's unique construction, namely that of providing lumber members 13 around the edges of the core allows skirt member 17 to be appended thereto without the possibility of exposing the edges of center core 11 to water seeping into groove portion 16.

As one example of the economy of wood realized in fabricating a cutting board according to the present invention two identically sized boards are fabricated, one according to the present invention the other by adhesively securing solid lumber strips in side by side relationship, total wood consumption including scrap is 3.2 board feet in the first case whereas in the second, the total wood consumption including scrap is 11.0 board feet.

Having thus described the invention, what is claimed is:

1. A cutting board adapted to be attached to the top of a household appliance comprising: a particle board core; a layer of adhesive completely coating said particle board core; a plurality of thin strips of veneer sheets adhesively attached to one face of said particle board core in an orderly fashion to provide a durable cutting surface thereon, an opposed face of said particle board core having at least one veneer sheet adhesively attached thereto to give said board the appearance of being of solid lumber construction; lumber edge members surrounding the edges of said particle board core and overlaid by said veneer sheets; said adhesive coating being further characterized in that it forms a waterproof barrier surrounding said particle board core and attaches said veneer sheets and lumber edges to said core.

2. The cutting board of claim 1 wherein said veneer sheets are of a thickness in the range of between one twenty-second and one-tenth inch.

3. The cutting board of claim 2 wherein said veneer sheets are of a thickness of about one-sixteenth inch.

4. The cutting board of claim 1 wherein at least one of said lumber edges includes groove means for attaching a border portion thereto to give the appearance of greater thickness.

5. The cutting board of claim 1 wherein said veneer strips are arranged in parallel side by side relation and are in the range of about two and one quarter inches in width and about one-sixteenth inch in thickness.

6. The cutting board of claim 1 wherein a single sheet of veneer is adhesively attached to said opposed face of said particle board core covering the entire surface thereof, said one face having a plurality of veneer strips adhesively attached and covering the entire surface thereof.

* * * * *